United States Patent Office 3,783,027
Patented Jan. 1, 1974

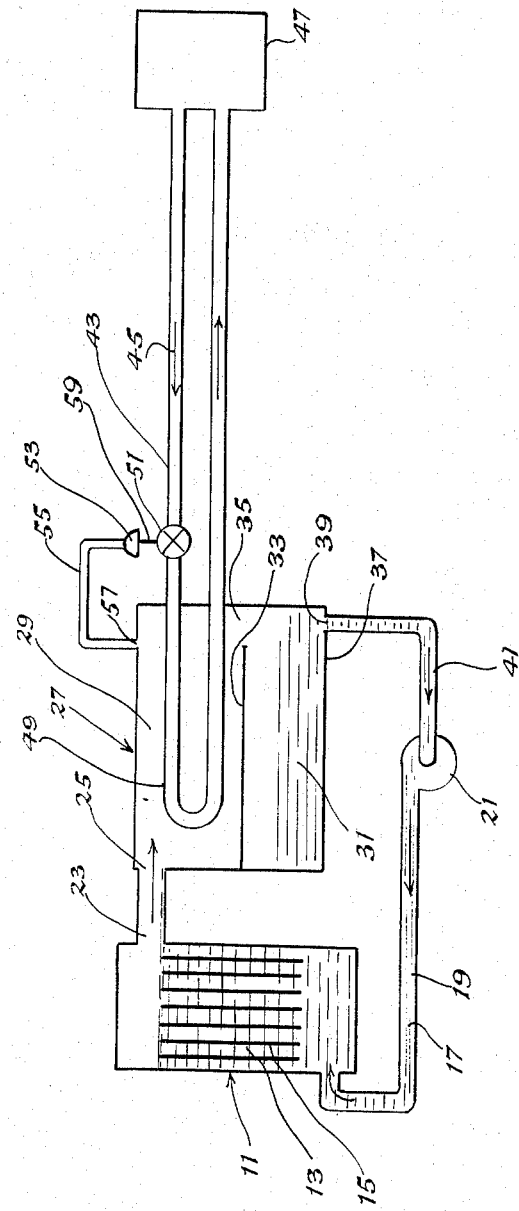

3,783,027
APPARATUS AND METHOD FOR MAKING CHLORINE HYDRATE FROM HIGH ENERGY DENSITY BATTERY ELECTROLYTE AND CHLORINE
Harry K. Bjorkman, Birmingham, Mich., assignor to Udylite Corporation, Warren, Mich.
Filed Nov. 18, 1971, Ser. No. 200,046
Int. Cl. H01m 27/14
U.S. Cl. 136—86 C                                    11 Claims

ABSTRACT OF THE DISCLOSURE

An apparatus for making chlorine hydrate from an aqueous medium such as a solution of zinc chloride, and chlorine, despite varying feed rates, concentrations, proportions and temperatures of the solution and the chlorine, includes a vessel having an inlet for addition of the solution and chlorine and an outlet for removal of the medium, upper and lower zones in the vessel, the upper one of which is for gaseous chlorine and the lower one of which holds the aqueous medium before discharge, and a cooling coil, pipe or other heat transfer means in the upper zone adapted to cool the chlorine and moisture in contact with it so as to form chlorine hydrate. A pressure sensor is present in the upper zone and in response to an excess of chlorine, which causes an increase in pressure in the zone, the sensor actuates a coolant-controlling valve to increase the feed of coolant to the heat transfer means, thereby removing more chlorine from the zone, as chlorine hydrate, and reducing the pressure. The reverse action takes place when the chlorine content and related pressure are too low. The chlorine-solution feed to the vessel is usually of chlorine and electrolyte from a high energy density secondary battery during a charge cycle and the solution removed from the lower zone of the present vessel is returned to such cell.

BACKGROUND OF THE INVENTION

During the charging of high energy density secondary batteries utilizing chlorine and a highly electropositive metal as electrodes and reactants, an aqueous metal chloride salt electrolyte is circulated through the battery cells, plating out the metal on an electrode base and generating chlorine at the other electrode. In cells wherein the electrodes are of zinc and chlorine (on a carbon base) the aqueous zinc chloride electrolyte passing through the cells carries with it chlorine produced during the charging operation. Depending on the charging voltage current flow, electrolyte flow rate, initial electrolyte temperature, initial electrolyte concentration of dissolved chlorine and the efficiency of the charging operation, flows of electrolyte and chlorine at different temperature, concentrations, feed rates, and proportions will result. In a preferred method of holding chlorine ready for use when the battery is to be employed, during which use chlorine and electrolyte must be passed through the battery, the chlorine is converted to chlorine hydrate. A method for effecting this is described in U.S. patent application S.N. 50,054, now U.S. 3,713,888, entitled "Process for Electrical Energy Using Solid Halogen Hydrates," of which the present inventor is a co-inventor. Another method is described in an application for a U.S. patent filed the same day as this application, entitled Manufacture of Chlorine Hydrate, and identified as Case U.S. Ser. No. 200,047, of which the present inventor is also a co-inventor. During the formation of chlorine hydrate by the methods described therein, chlorine and water moisture are brought together at a cold site, under which conditions, at the appropriate temperature and pressure, chlorine hydrate ($Cl_2 \cdot 8H_2O$) is formed as a solid. The chlorine hydrate may be removed and held under suitable temperature and pressure conditions to maintain it in the solid state, and it may be fed back to an electrolyte stream being returned to the battery, in which stream it can release elemental chlorine, preferably as a dissolved or entrained gas, ready for use as a reactant in the described batteries during electrical discharge.

Because of the variations in feeds to a zone in which chlorine hydrate is being produced and because of changes in the concentrations, proportion of chlorine, temperatures and heat transfer coefficient of the cooling means, often due to deposits of chlorine hydrate forming thereon, the production of chlorine hydrate is not regular. This sometimes gives rise to excess pressures or to greatly diminished rates of production of the hydrate.

SUMMARY OF THE INVENTION

In an effort to improve the method for the manufacture of halogen hydrates over that described above, the present invention has been made in which chlorine and moisture vapor from an aqueous salt solution, such as that resulting from the charging of a high energy density zinc-zinc chloride-chlorine type battery, are reacted at a cooling means and the cooling capacity of the cooling means is changed in response to pressure developed in the reaction zone used for the formation of the chlorine hydrate. Thus, in accordance with this invention, an aqueous salt solution and chlorine are fed into a hydrate-forming zone containing a cooling means, a portion of the moisture content of the salt solution is vaporized and chlorine gas is removed from it, the balance of the salt solution is removed from the zone, the moisture and chlorine are contacted with the cooling means and are reacted to form chlorine hydrate thereon, and the cooling capacity of the cooling means is increased when the pressure in the hydrate forming zone increases, within a predetermined range, and is diminished when the pressure decreases, whereby the gas pressure is maintained as desired in said zone within predetermined limits and the conversion of the chlorine and moisture to chlorine hydrate is continued at a desired rate. In accordance with this invention an apparatus for producing chlorine hydrate from aqueous salt solution and chlorine charged to the apparatus at varying rates, concentrations and temperatures, and maintaining the pressure of the chlorine within a predetermined range, comprises a vessel having an inlet for addition of aqueous salt-chlorine mixture, and an outlet for aqueous salt solution, a plurality of zones in the vessel, a tower one of which is for aqueous salt solution and an upper one of which is for gaseous chlorine, cooling means in the chlorine zone for lowering the temperature of the chlorine in the presence of moisture so as to form chlorine hydrate, said cooling means including a cooling fluid, and pressure responsive actuating means, responsive to the pressure of chlorine in the chlorine zone and having actuating means for changing the cooling capacity of the coolant in the cooling means so as to convert the chlorine to chlorine hydrate at a rate that will keep the chlorine gas pressure within the predetermined range.

DESCRIPTION OF THE PREFERRED EMBODIMENTS

The present invention and its mode of operation will be apparent from the following description, taken in conjunction with the accompanying drawing, in which:

The figure shown is a schematic representation of the apparatus of the present invention, in partial section, illustrating flows of electrolyte, elemental chlorine and coolant and the production of chlorine hydrate on a cooling coil.

A battery stack 11 of a plurality of cells 13, each of which is formed by parts of a pair of bipolar electrodes 15, has aqueous zinc chloride electrolyte 17 fed to it through lines 19 by the pressure of pump 21. Electrical connections to the electrodes, not shown, are utilized to charge the secondary battery illustrated, during which charging electrolyte 17 is flowed through the battery cells. Chlorine gas (elemental chlorine) is generated at the cell anodes and mixes with the flowing electrolyte, exiting from the battery through passage 23, from which the mixture of chlorine and electrolyte, with some of the chlorine dissolved in the electrolyte, passes through inlet opening 25 into vessel 27, which includes upper hydrate-forming or chlorine zone 29 and lower electrolyte or salt solution zone 31. The electrolyte entering vessel 27 is usually lower in zinc chloride content than that entering the bottom of cell stack 11 because of removal of zinc to plate out on the cathode and the generation of chlorine at the anode. The elemental chlorine, as gas bubbles or dissolves in the electrolyte, separates to a significant extent from the electrolyte in the chlorine zone 29 shortly after entering it. The remainder of the chlorine is mechanically agitated and its separation from the electrolyte is assisted by mechanical contact with a surface or surfaces in the chlorine zone, principally with shelf or floor 33 at the bottom of the zone, which also aids in separating the gas zone from a lower electrolyte zone. The electrolyte flows along the length of the shelf to near the side opposite that where it entered and passes through opening 35 into the lower zone. In such zone it is desirable to maintain electrolyte level at approximately half the distance between the zone bottom 37 and shelf or zone ceiling 33. This assures a desired head of the electrolyte for removal from the vessel 27 through outlet opening 39 to return through line 41 to pump 21 and thence back to the battery.

The chlorine gas in zone 29 must be removed from it or a pressure buildup will occur therein, which may carry back through the battery stack and disturb the charging of the battery. The only ways to remove the chlorine are by venting (which is unsatisfactory because it requires additional storage facilities and decreases the efficiency of conversion of chlorine to its hydrate), and completely reacting it to chlorine hydrate. The latter course is highly preferable and is followed by forming the hydrate from the chlorine and moisture, usually released as vapor by impingement of the aqueous zinc chloride solution on shelf 33, at the surfaces of a cooling means, shown as cooling coil 43. However, to make sure that all chlorine is converted to chlorine hydrate, at whatever flow rate it is delivered to the vessel, could require excessive coolant or refrigerant flow through the coil 43 and in some cases, as when chlorine flow from the battery stack is low, the excessive coolant flow might cause the formation of ice crystals, rather than chlorine hydrate, on the coil. Therefore, there has been provided a means for regulating the flow of coolant through the coil so that when chlorine content in the vessel is high the flow of coolant will be increased, thereby producing more chlorine hydrate and consuming the chlorine gas, and when the chlorine content is low, the coolant flow will be diminished.

The flow of coolant 45 or refrigerant in the cooling means or coil 43 is from refrigerating means 47 which usually produces a constant temperature coolant but can, in response to a controller, change the temperature of the coolant. Refrigerating means 47 is equipped with a pump, not shown, to circulate coolant through cooling coil 43 and to produce a temperature at a surface 49 of coil 43 sufficiently low to form chlorine hydrate thereon under the conditions of the chlorine zone. Control means, such as a valve 51, may be located in the cooling coil or a line to it to regulate the flow of coolant to the chlorine zone section of the coil. To make valve 51 responsive to the amuont of chlorine in the chlorine zone it is actuated by a pressure responsive device in the chlorine zone which is preferably of the bellows 53, diaphragm or other suitable pressure response type, which contracts when pressure is increased and expands upon pressure decreases. Such a unit is preferably located outside the chlorine zone and communicates with it through pressure line 55 to tap point 57. The external location of the bellows or diaphragm is considered desirable to avoid exposure to the moist chlorine atmosphere of more parts of the unit than would be necessary. The pressure responsive means may transmit the forces of expansion or contraction mechanically, as indicated by valve stem 59, or by suitable hydraulic or electrical connections or combinations thereof. The pressure differential created in the chlorine zone by the influx of more chlorine than is removed from the system or by the charging of the chlorine zone with less chlorine than is consumed in forming the hydrate is favored by the maintenance of a substantially constant head of electrolyte in the solution zone of the vessel and appropriate means may be included in conjunction with the vessel for holding such level constant. Also, of course, leaks and vented openings can diminish the sensitivity of the response of the pressure actuated means to the flow of excess chlorine into the system and, therefore, the vessel will usually be gas tight and may have check valves or other suitable means installed in the inlet to the vessel.

For normal operation, the concentration of aqueous electrolyte fed to the vessel 27 will be between 0.1% and saturation of metal chloride, preferably from 10 to 35% thereof; the content of elemental chlorine or gaseous chlorine per volume of electrolyte solution will be from 0.05 to 20 volumes, preferably from 0.1 to 4 volumes; the temperature will be from 15 to 90° C., preferably from 30 to 70° C.; and the pressure will be from 0.5 to 10 atmospheres, preferably from 0.8 to 2 atmospheres and most preferably, about atmospheric ±10%. The cooling surface of the cooling means in the chlorine zone will be large enough to remove elemental chlorine from the zone at a rate equal to that charged to the chlorine zone with the electrolyte under the various conditions of charging. The cooling fluid may be any suitable liquid or gas but is preferably either a halogenated hydrocarbon, such as one of the Freon or Genetron refrigerants, or a brine solution. Instead of open-shut reaction of control valve 51, a proportional controlling operation will preferably be employed, which gently regulates the proportion of refrigerant flowing through the cooling coil. Thus, undesirable controller "hunting" for an equilibrium position is avoided.

In operation, the chlorine and electrolyte flowing from near the top of a battery stack enter the chlorine zone, the chlorine separates from the electrolyte and remains in the chlorine zone, while the electrolyte falls into contact with shelf 33 and flows along it until it flows through the opening therein and into the electrolyte zone. In this zone it assumes the desired level, above which is a mixture of chlorine and water vapor. During flow over the shelf and due to the temperature of the electrolyte, moisture is vaporized from it and rises with the chlorine, in intimate contact with it until the mixture contacts the surface of the cooling coil, where it is lowered to a temperature suitable for the formation of chlorine hydrate. The hydrate forms on the coil and this very formation changes the heat transfer coefficient of the coil, usually lowering it appreciably. Therefore, means may be provided for periodically removing hydrate from the coil. At such removal, the hydrate may be mixed with the electrolyte but can be filtered from it for pumping of electrolyte back to the battery. Due to changes in the flows of electrolyte to the vessel, and changes in the concentrations and proportions of electrolyte and chlorine in the fluid charged to the vessel, as well as due to changes in the heat transfer coefficient of the cooling coil, variations in chlorine content in the chlorine zone will occur. When chlorine is increased the bellows will be contracted and valve 51 will be opened to allow more refrigerant to flow through the cooling coil. When the chlorine content is too low, the reverse effect will be obtained. In both cases, within the predetermined ranges set, which will usually be the pressure ranges previously given, the flow of refrigerant will compensate for differences in chlorine flows, producing a controlled and steady process for conversion of chlorine to chlorine hydrate.

Instead of the flow of the coolant being controlled, its temperature may be regulated by having bellows 53 operatively connected with temperature control means in refrigerating mechanism 47. In such a case, flow may be maintained constant and coolant temperature may be changed or changes in both flow and temperature may be utilized. Since chlorine hydrate formation and chlorine removal from the gas phase are favored by low temperatures, refrigerant condition controls furnish a practicable method for uniformly producing chlorine hydrate despite variations in chlorine feeds to the converting vessel.

When the chlorine hydrate is to be re-converted to chlorine gas for mixing with electrolyte to feed the battery stack during discharge periods, similar temperature controls may be utilized but in such cases instead of a refrigerant, a heating means may be employed, inserted in a tank of chlorine hydrate suspension in electrolyte. Then, when insufficient chlorine is present the controller may allow additional heat exchange means to flow to convert the hydrate to chlorine gas and water and when there is too much chlorine present the flow of heat transfer fluid may be diminished. Alternatively an electric heating device or a blower for hot gas may be controlled in this manner.

The method and apparatus described are preferably employed in conjunction with the manufacture of chlorine hydrate by the procedure of U.S. Ser. No. 200,047, previously mentioned, but are also applicable to other methods for the manufacture of halogen hydrates, such as those described in U.S. patent application Ser. No. 50,054, also previously mentioned. A heater for controlling the temperature of the electrolyte, described in U.S. Ser. No. 200,047, may be used and assists in the vaporization of the water of the electrolyte. Instead of employing electrolytes from high energy density batteries, other sources of water may be employed. Thus, although it is very important to be able to have produced chlorine hydrate from high energy density battery electrolyte the advantages of the present invention are such that it has a much broader area of application.

When the high energy density batteries are of the refuellable type, wherein the bipolar or metal electrodes are replaced with new ones periodically, without conventional in-cell charging, halogen hydrate may be produced as a convenient source of chlorine for the discharge operation of the cell but will not take chlorine from the charging of the same cell. Of course, if such replacement electrodes are produced elsewhere by a typical "charging" reaction, the chlorine produced my be converted to the hydrate for subsequent use in a battery.

In following the procedures of U.S. Ser. No. 200,047, the same temperatures described therein will be used for the cooling means to lower the temperature of the chlorine and moisture to produce the hydrate. Thus, when operating at about atmospheric pressure the surface where hydrate is formed should be in the range of —50 to +9° C. preferably —30 to +9° C. and most preferably —10 to +7° C. In many operations this temperature will be about 5° C. and it will be no higher than the critical temperature of the chlorine hydrate. Higher pressures require correspondingly higher temperatures. To allow for heat losses through the cooling coils or other heat transfer mechanisms, temperatures of refrigerant fluid may be from 1 to 20° C. lower.

The following examples illustrate the invention but do not limit it. All parts are by weight and all temperatures are in ° C., unless otherwise indicated.

Example 1

An apparatus of the type shown in the drawing is employed to produce chlorine hydrate by the method of this invention, utilizing the conditions described in the preceding specification. The high energy density battery from which chlorine-depleted electrolyte is fed to the hydrate-forming vessel and to which the electrolyte is returned is one containing zinc and chlorine-porous carbon bipolar electrodes, each cell of which, on discharge develops 1.6 to 1.7 volts at 8 amperes while each has an area of about 170 cm.$^2$. The cells are joined together in series in a cell stack which produces 50 volts open circuit and from about 40 volts at 8 amperes. The operating temperature of the cell is about 30° C. and the concentration of zinc chloride in the aqueous electrolyte is about 15% at the beginning of discharge, rising to 35%. Conversely, when charging, the concentration is initially higher and diminishes, within the 35% to 15% concentration range. The dissolved chlorine in the electrolyte feed to the cells during discharge on a volume basis, is about 1 volume per volume of electrolyte, although concentrations from 0.1 to 3 volumes are also used. When exiting from the cells, the electrolyte when operating at about 8 amps contains only a fraction of the dissolved chlorine, e.g., 0.9 volume of chlorine per volume of electrolyte. Again, conversely, during charging the chlorine concentration increases and additionally, dispersed chlorine is also present in the battery effluent.

The effluents from a plurality of batteries (two to ten, depending on the uses of the batteries) being charged at the current and voltage given above are combined and fed into the hydrate-forming vessel at flow rates of about 15 liters per minute per battery at atmospheric pressure, with the chlorine gas liberated during the charging reaction. The 25% $ZnCl_2$ electrolyte feed falls onto the shelf of the apparatus, gas is liberated from the electrolyte by the mechanical action and additionally, by employing heat to heat the electrolyte in the bottom zone of the vessel to a temperature of 45° C., which also vaporizes additional moisture from it.

The cooling coil is maintained at a surface temperature of about ±5° C. by flowing through it cold brine refrigerant at a temperature of —5° C., the flow of refrigerant being sufficient to maintain that temperature, with a pressure controlled valve in the cooling line entering the hydrate-forming vessel regulating flow.

When the internal pressure increases to one inch of water over atmospheric a pressure responsive bellows actuates the coolant inlet valve and opens it wider, allowing more coolant to flow into the hydrate zone to consume chlorine there. Similarly, when the pressure drops to exactly 1 atmosphere the pressure controlled valve closes, since it is then evident that chlorine is not being fed to the hydrate-forming vessel fast enough. The rate of hydrate formation resulting from the controlled cooling, corresponds to the rate of feed of chlorine, allowing for the different molecular weights of chlorine and chlorine hydrate. After 45 minutes operation, a deposit of approximately ½ inch of hydrate is found on the coils of the cooling means. Analysis shows it to be chlorine hydrate, $Cl_2 \cdot 8H_2O$. It is stored on the coils for ultimate generation of chlorine and return to the batteries when they are being discharged.

The electrolyte from which some moisture has been removed in the formation of chlorine hydrate is returned to the batteries at approximately the same rate as that of withdrawal and the process is continued, with periodic shutdowns to remove the halogen hydrate. In the event of such shutdowns, standby hydrating vessels and refrigerating units are employed so that battery charging may be continued without series interruption.

Example 2

The procedure of Example 1 is followed with the exceptions that: an automatic shaker is employed to periodically remove any buildup of halogen hydrate on the cooling coils; the refrigerant is a 50% aqueous ethylene glycol solution at a temperature of −10° C.; the average temperature of the refrigerating means where halogen hydrate is formed is about 0° C.; the pressure responsive means is a mechanical linkage to the coolant inlet valve (of the butterfly type); and the pressure differential at which the valve operates is between atmospheric pressure and five inches of water, with proportional valve openings over this range. Under such conditions the rate of production of the hydrate is faster and halting of the process for the removal of halogen hydrate is more frequent (about twice as frequent). However, some ice is formed along with the hydrate.

In variation of this procedure the mechanical linkage is employed to regulate the operation of the refrigerating unit so as to change the temperature of the refrigerant over the range of −15 to 5° C., so that when the chlorine pressure builds up to about five inches of water, refrigerant at 15° C. is pumped through the refrigerating coil and when the pressure falls to 0.2 inch water, the coolant temperature will be +5° C. Provision is also made for shutting off the coolant entirely when the pressure drops to atmospheric.

Materials of construction utilized in making the vessels, lines and pumps utilized are preferably of titanium or titanium-lined, although polyvinylchloride, polytetrafluoroethylene-lined or glass-lined parts are also suitable. The type of refrigerant employed is not critical and substitution of Freon for the aqueous ethylene glycol or brine solutions results in no significant change in refrigeration effects.

In variations of the processes chlorine hydrate is made from water and chlorine, following the described method, and in other cases the gas pressure control regulation of coolant is employed to control the production of chlorine hydrate by bubbling chlorine gas through refrigerated zinc chloride solution.

The invention has been described with respect to illustrations and examples thereof but it is clear that it is not to be limited to these because equivalents may be substituted for elements or steps in the invention without departing from the spirit of the invention or going beyond its scope.

What is claimed is:

1. Method of producing chlorine hydrate in a battery, during the charging of the battery whereby chlorine is formed, said battery having (a) a compartment means with a stack of cells therein, said compartment having a compartment inlet means and a compartment outlet means; (b) a chlorine hydrate forming vessel means with an inlet means and an outlet means; and (c) cooling means comprising the steps of:

(1) passing an aqueous metal chloride electrolyte solution with the chlorine mixed therein from the compartment means into the hydrate forming vessel means, said vessel having an upper chlorine zone and a lower solution zone;
   (2) vaporizing a portion of the aqueous metal chloride solution;
   (3) cooling the upper chlorine zone of the hydrate forming vessel means by passing coolant through the cooling zone in response to an increase in pressure in the chlorine zone;
   (4) reacting chlorine and water, to form chlorine hydrate; and
   (5) passing the solution from the vessel outlet means to the compartment inlet means.

2. The method of claim 1, further comprising passing the electrolyte through the inlet means of the hydrate forming vessel and onto a shelf in the chlorine zone, thereby separating a portion of the chlorine and water vapor from the electrolyte.

3. The method of claim 1, further comprising forming the chlorine hydrate on the cooling means.

4. The method of claim 1, further comprising maintaining a head of electrolyte in the solution zone in order to adjust the pressure in the chlorine zone thereby actuating the cooling means to decrease the temperature in the chlorine zone sufficient to form chlorine hydrate.

5. The method of claim 1, wherein the metal chloride solution is a zinc chloride solution having a concentration ranging from about 0.1 percent by weight to saturation.

6. The method of claim 2, further comprising circulating coolant through the cooling means which is a tube located above the shelf in the upper portion of the chlorine zone of the hydrate formation vessel means so that the temperature of the cooling means in contact with the chlorine gas and moisture is in the range of −30° C. to +9° C.

7. An apparatus for producing chlorine hydrate in a battery during charging of the battery wherein chlorine is formed, said battery having (a) a compartment means with a stack of cells therein, said compartment having an inlet means and an outlet means and (b) a chlorine hydrate forming vessel means with an inlet means and an outlet means comprising;

(1) means for passing an aqueous metal chloride electrolyte solution mixed with chlorine therein from the compartment outlet means to the hydrate forming vessel inlet means and from the hydrate forming vessel outlet means to the compartment inlet means;
   (2) an upper chlorine zone in the hydrate forming vessel means;
   (3) a lower electrolyte solution zone in the hydrate forming vessel means;
   (4) cooling means in the chlorine zone for lowering the temperature of the chlorine in the presence of moisture so as to form chlorine hydrate; and
   (5) pressure responsive actuating means, responsive to the chlorine pressure in the chlorine zone and having actuating means for adjusting the cooling of the cooling means in order to convert chlorine and moisture to chlorine hydrate at a rate that will keep the chlorine gas pressure within a predetermined range.

8. The apparatus of claim 7, further comprising a shelf in the chlorine zone, located adjacent to the hydrate forming vessel inlet means and adapted so that the electrolyte solution with chlorine mixed therein will contact the shelf thereby vaporizing the moisture and separating at least a portion of the chlorine from the electrolyte solution.

9. The apparatus of claim 7, further comprising means for maintaining a head of the electrolyte in the solution zone in order to adjust the pressure in the chlorine zone so as to actuate the cooling means to decrease the temperature in the chlorine zone sufficient to form chlorine hydrate.

10. The apparatus of claim 8, wherein the cooling means is a tube having coolant flowing therethrough and is located above the shelf in the hydrate forming vessel means, the coolant flowing through the tube in response to an increase in pressure in the chlorine zone.

11. The apparatus of claim 8, wherein the shelf is substantially horizontal, and extends from a side of the hydrate forming vessel means to or near the opposite side, leaving an opening between the end of the shelf and the opposite side of the hydrate forming vessel means for the flow of zinc chloride solution into the electrolyte solution zone.

References Cited

UNITED STATES PATENTS

| | | | |
|---|---|---|---|
| 1,723,300 | 8/1929 | Pritchard et al. | 423—241 |
| 2,318,512 | 5/1943 | McHaffie | 423—241 |
| 2,572,296 | 10/1951 | Zimmerman et al. | 136—86 A |
| 2,921,110 | 1/1960 | Crowley et al. | 136—86 A |
| 3,607,421 | 9/1971 | Werth | 136—86 A |

ALLEN B. CURTIS, Primary Examiner

H. A. FEELEY, Assistant Examiner

U.S. Cl. X.R.

55—71; 423—241

UNITED STATES PATENT OFFICE
CERTIFICATE OF CORRECTION

Patent No. 3,783,027         Dated January 1, 1974

Inventor(s)   HARRY K. BJORKMAN

It is certified that error appears in the above-identified patent and that said Letters Patent are hereby corrected as shown below:

In the heading, column 1, lines 5 and 6, "assignor to Udylite Corporation, Warren, Mich." should read -- by mesne assignments to Occidental Energy Development Company, Madison Heights, Mich., a corporation of California -- . Column 2, line 55, "tower" should read -- lower -- . Column 4, line 10, "amuont" should read -- amount -- .

Signed and sealed this 6th day of August 1974.

(SEAL)
Attest:

McCOY M. GIBSON, JR.
Attesting Officer

C. MARSHALL DANN
Commissioner of Patents